United States Patent
Hitz et al.

(10) Patent No.: US 7,962,531 B2
(45) Date of Patent: Jun. 14, 2011

(54) MULTIPLE CONCURRENT ACTIVE FILE SYSTEMS

(75) Inventors: David Hitz, Los Altos, CA (US); John K. Edwards, Sunnyvale, CA (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/698,223

(22) Filed: Feb. 2, 2010

(65) Prior Publication Data

US 2010/0138394 A1 Jun. 3, 2010

Related U.S. Application Data

(63) Continuation of application No. 11/057,409, filed on Feb. 14, 2005, now Pat. No. 7,685,169, which is a continuation of application No. 10/165,188, filed on Jun. 7, 2002, now Pat. No. 6,857,001.

(51) Int. Cl.
*G06F 17/30* (2006.01)

(52) U.S. Cl. ......................................... 707/822; 707/609

(58) Field of Classification Search .................. 707/609, 707/778, 822, 999.201
See application file for complete search history.

(56) References Cited

U.S. PATENT DOCUMENTS

| | | | |
|---|---|---|---|
| 4,742,450 A | 5/1988 | Duvall et al. | |
| 4,814,971 A | 3/1989 | Thatte | |
| 4,825,354 A | 4/1989 | Agrawal et al. | |
| 4,875,159 A | 10/1989 | Cary et al. | |
| 5,014,192 A * | 5/1991 | Mansfield et al. | 1/1 |
| 5,043,871 A | 8/1991 | Nishigaki | |
| 5,043,876 A | 8/1991 | Terry | |
| 5,088,026 A | 2/1992 | Bozman et al. | |
| 5,129,085 A | 7/1992 | Yamasaki | |
| 5,144,659 A | 9/1992 | Jones | |
| 5,163,148 A | 11/1992 | Walls | |
| 5,182,805 A | 1/1993 | Campbell | |

(Continued)

FOREIGN PATENT DOCUMENTS

CN 1316707 A 10/2001

(Continued)

OTHER PUBLICATIONS

Bobrowski, Steven. "Protecting Your Data: Overview and Comparison of Backup and Recovery Features in Database Servers", DBMS, Jul. 1993, pp. 55-59, vol. 6, No. 8.

(Continued)

*Primary Examiner* — Cheryl Lewis
(74) *Attorney, Agent, or Firm* — Cesari and McKenna, LLP

(57) ABSTRACT

A method and apparatus for operating a data storage system is disclosed. An original active file system holds incoming write transactions. Data is written at a selected time to blocks in a data storage device of the original active file system, the data written to blocks which do not hold old data of the data storage system. Pointers to data of the original active file system are written at the selected time to the data storage device, the pointers written to blocks which do not hold old data of the data storage system, the pointers and a previously saved data of the active file system forming a consistency point of the original active file system at the selected time. A new active file system is started using the consistency point of the original active file system at the selected time.

30 Claims, 6 Drawing Sheets

U.S. PATENT DOCUMENTS

| | | | |
|---|---|---|---|
| 5,195,100 A | 3/1993 | Katz et al. | |
| 5,201,044 A | 4/1993 | Frey et al. | |
| 5,208,813 A | 5/1993 | Stallmo | |
| 5,210,866 A | 5/1993 | Milligan et al. | |
| 5,218,695 A | 6/1993 | Noveck et al. | |
| 5,255,270 A | 10/1993 | Yanai et al. | |
| 5,278,838 A | 1/1994 | Ng et al. | |
| 5,287,496 A | 2/1994 | Chen et al. | |
| 5,313,646 A | 5/1994 | Hendricks et al. | |
| 5,315,602 A | 5/1994 | Noya et al. | |
| 5,357,509 A | 10/1994 | Ohizumi | |
| 5,367,698 A | 11/1994 | Webber et al. | |
| 5,369,757 A | 11/1994 | Spiro et al. | |
| 5,379,391 A | 1/1995 | Belsan et al. | |
| 5,379,417 A | 1/1995 | Lui et al. | |
| 5,390,187 A | 2/1995 | Stallmo | |
| 5,392,446 A | 2/1995 | Tower et al. | |
| 5,398,253 A | 3/1995 | Gordon | |
| 5,403,639 A | 4/1995 | Belsan et al. | |
| 5,410,667 A | 4/1995 | Belsan et al. | |
| 5,452,444 A | 9/1995 | Solomon | |
| 5,455,946 A | 10/1995 | Mohan et al. | |
| 5,457,796 A | 10/1995 | Thompson | |
| 5,481,699 A | 1/1996 | Saether | |
| 5,490,248 A | 2/1996 | Dan et al. | |
| 5,504,857 A | 4/1996 | Baird et al. | |
| 5,566,297 A | 10/1996 | Devarakonda et al. | |
| 5,604,862 A * | 2/1997 | Midgely et al. | 714/6 |
| 5,633,999 A * | 5/1997 | Clowes et al. | 714/6 |
| 5,649,152 A | 7/1997 | Ohram et al. | |
| 5,675,802 A | 10/1997 | Allen et al. | |
| 5,819,292 A | 10/1998 | Hitz et al. | |
| 5,828,876 A | 10/1998 | Fish et al. | |
| 5,835,953 A | 11/1998 | Ohran | |
| 5,838,964 A | 11/1998 | Gubser | |
| 5,870,764 A | 2/1999 | Lo et al. | |
| 5,884,328 A | 3/1999 | Mosher, Jr. | |
| 5,963,962 A | 10/1999 | Hitz et al. | |
| 6,006,227 A | 12/1999 | Freeman et al. | |
| 6,006,232 A | 12/1999 | Lyons | |
| 6,067,541 A | 5/2000 | Raju et al. | |
| 6,101,507 A | 8/2000 | Cane et al. | |
| 6,101,585 A | 8/2000 | Brown | |
| 6,205,450 B1 | 3/2001 | Kanome | |
| 6,289,356 B1 | 9/2001 | Hitz et al. | |
| 6,317,844 B1 | 11/2001 | Kleiman | |
| 6,341,341 B1 | 1/2002 | Grummon et al. | |
| 6,397,307 B2 | 5/2002 | Ohran | |
| 6,516,351 B2 | 2/2003 | Borr | |
| 6,604,118 B2 * | 8/2003 | Kleiman et al. | 1/1 |
| 6,636,878 B1 * | 10/2003 | Rudoff | 1/1 |
| 6,636,879 B1 | 10/2003 | Doucette et al. | |
| 6,665,689 B2 | 12/2003 | Muhlestein | |
| 6,721,764 B2 | 4/2004 | Hitz et al. | |
| 6,795,966 B1 | 9/2004 | Lim et al. | |
| 6,829,617 B2 | 12/2004 | Sawdon et al. | |
| 6,857,001 B2 * | 2/2005 | Hitz et al. | 1/1 |
| 6,915,447 B2 | 7/2005 | Kleiman | |
| 7,072,916 B1 | 7/2006 | Lewis et al. | |
| 7,174,352 B2 | 2/2007 | Kleiman et al. | |
| 7,685,169 B2 * | 3/2010 | Hitz et al. | 707/999.201 |
| 2001/0022792 A1 | 9/2001 | Maeno et al. | |
| 2001/0044807 A1 | 11/2001 | Kleiman et al. | |
| 2002/0007417 A1 | 1/2002 | Kleiman | |
| 2002/0019874 A1 | 2/2002 | Borr | |
| 2002/0019936 A1 | 2/2002 | Hitz et al. | |
| 2002/0049718 A1 | 4/2002 | Kleiman et al. | |
| 2002/0059172 A1 | 5/2002 | Muhlestein | |
| 2002/0083037 A1 | 6/2002 | Lewis et al. | |
| 2002/0091670 A1 | 7/2002 | Hitz et al. | |
| 2003/0229656 A1 | 12/2003 | Hitz et al. | |

FOREIGN PATENT DOCUMENTS

| | | |
|---|---|---|
| EP | 0 359 384 A2 | 3/1990 |
| EP | 0 359 384 A3 | 7/1991 |
| EP | 0 453 193 A2 | 10/1991 |
| EP | 0 453 193 A3 | 7/1993 |
| EP | 0 359 384 B1 | 1/1998 |
| EP | 94 92 1242 | 6/1998 |
| EP | 1 003 103 A2 | 5/2000 |
| EP | 1 197 836 A2 | 4/2002 |
| EP | 01 003 103 B1 | 10/2008 |
| WO | WO 89/03086 A1 | 4/1989 |
| WO | WO 91/13404 A1 | 9/1991 |
| WO | WO 94/29795 A1 | 12/1994 |
| WO | WO 94/29796 A1 | 12/1994 |
| WO | WO 94/29807 A1 | 12/1994 |
| WO | WO 99/45456 A1 | 9/1999 |
| WO | WO 99/46680 A1 | 9/1999 |
| WO | WO 99/66401 A1 | 12/1999 |
| WO | WO 00/07104 A1 | 2/2000 |
| WO | WO 00/11553 A1 | 3/2000 |
| WO | WO 01/14991 A2 | 3/2001 |
| WO | WO 01/14991 A3 | 3/2001 |
| WO | WO 01/31446 A1 | 5/2001 |
| WO | WO 01/43368 A1 | 6/2001 |
| WO | WO 02/17057 A2 | 2/2002 |
| WO | WO 02/29572 A2 | 4/2002 |
| WO | WO 02/29573 A2 | 4/2002 |
| WO | WO 02/29573 A3 | 4/2002 |
| WO | WO 03/105026 A1 | 12/2003 |

OTHER PUBLICATIONS

IBM, "Migrated Data Backup Utility", IBM Technical Disclosure Bulletin, Jun. 1994, pp. 505-507, vol. 37, No. 6B.

Srinivasan et al., "Recoverable File System for Microprocessor Systems", Microprocessors and Microsystems, May 1985, pp. 179-183, vol. 9, No. 4, Guildford, Surrey, Great Britain.

Siddha, S B et al., "A Persistent Snapshot Device Driver for Linux", Proceedings of Annual Linux Showcase and Conference, Nov. 10, 2001, pp. 173-182.

David Hitz et al. TR3002 "File System Design for a NFS File Server Appliance", published by Network Appliance, Inc. on Jan. 19, 1994, 23 pages.

Tatu Ylonen et al. "Concurrent Shadow Paging: Snapshots, Read-Only Transactions, and On-The-Fly Multilevel Incremental Dumping", published by Helsinki University of Technology, 22 pages.

Veritas File System 3.4 Administrator's Guide, published by Veritas, Nov. 2000, 227 pages.

Sin StorEdge Instant Image 2.0 System Administrator's Guide, published by Sun Microsystems, Feb. 2000, 106 pages.

Suresh B. Siddha. "Persistent Snapshots", published by Indian Institute of Science, Jan. 2000, 30 pages.

Christian Czezatke et al. "LinLogFS: A Log-Structured Filesystem for Linux", published by Usenix Association, Jun. 2000, 13 pages.

"The Enterprise Challenge Served by Snapshot", White Paper, published by LSI Logic Corporation, 2001, 8 pages.

Nabil Osorio et al. "Guidelines for Using Snapshot Storage Systems for Oracle Databases", published by Oracle Corporation, Oct. 2001, 13 pages.

Raymond A. Lorie, "Physical Integrity in a Large Segmented Database", published by ACM Transactions on Database Systems, vol. 2, No. 1, Mar. 1977, 14 pages.

Norman C. Hutchinson et al. "Logical vs. Physical File System Backup", published by Usenix Association, Feb. 1999, 12 pages.

Hugo Patterson et al. "SnapMirror: File System Based Asynchronous Mirroring for Disaster Recovery", published by Usenix Association, Jan. 2002, 14 pages.

Peter Smith et al. "Heterogeneous Process Migration: The Tui System", published by University of British Columbia, Mar. 14, 1997, 42 pages.

Douglas S. Santry et al. "Deciding When to Forget in the Elephant File System", published by University of British Columbia, Dec. 1999, 14 pages.

"Usage Guide for Sun StorEdge Instant Image Software with Oracle 8", published by Sun Microsystems, Feb. 2001, 64 pages.

Walter F. Tichy, "RCS—A System for Version Control", published by Purdue University, Jul. 1985, 18 pages.

"Veritas Database Edition for Oracle: Guidelines for Using Storage Checkpoint and Storage Rollback with Oracle Databases", published by Veritas White Paper, Aug. 2001, 19 pages.

"Veritas File System 3.4 for Solaris 9, Release Notes", published by Veritas, May 2002, 24 pages.
"Veritas Volume Manager 3.1.1: Administrator's Guide", published by Veritas, Feb. 2001, 295 pages.
"Veritas File System Administrator's Guide Solaris 5.0", published by Symantec Corporation, 2006, 294 pages.
"Veritas Database Edition for Sybase: Implementing Veritas FlashSnap in the Sybase ASE 12.0 Environment", published by Veritas White Paper, 11 pages.
"Veritas Volume Manager 3.1 Administrator's Guide for HP-UX 11i and HP-UX 11i Version 1.5", published by Hewlett Packard, Jun. 2001, 432 pages.
Tatu Ylonen et al. "Concurrent Shadow Paging: Fine Granularity Locking with Support for Extended Lock Modes and Early Releasing of Locks", published by Helsinki University of Technology, 28 pages.
"Sun Microsystem's Preliminary Invalidity Contentions and Accompanying Document Production for U.S. Patent 6,857,001", filed in the U.S. District Court, Northern CA District, San Francisco, 189 pages.
"Complaint for Patent Infringement and Demand for Jury Trial", filed Sep. 5, 2007 in United States District Court for the Eastern District of Texas, Lufkin Division. Civil Action No. 9:07CV206, 18 pages.
"Defendant Sun Microsystems, Inc.'s Answer and Counterclaim to Plaintiff Network Appliance, Inc.'s Complaint for Patent Infringement", filed Oct. 25, 2007 in United States District Court for the Eastern District of Texas, Lufkin Division. Civil Action No. 9:07CV206, 64 pages.
"Network Appliance's Reply to Sun's Answer and Counterclaims", filed Dec. 7, 2007 in United States District Court for the Northern District of California, San Francisco Division. Case No. 3:07-CV-06053-EDL, 39 pages.
European Search Report, published by the European Patent Office, mailed Apr. 16, 2007, 4 pages.
PCT International Search Report, published by the PCT Office for International Application No. PCT/US03-17497, mailed Sep. 8, 2003, 3 pages.
"Plaintiff NetApp, Inc.'s Response to Sun's Opening Claim Construction Brief", filed Jul. 21, 2008 in United States District Court, Northern District of California, San Francisco Division, Case No. 3:07-CV-06053-EDL, 47 pages.
"Sun Microsystems, Inc.'s Opening Claim Construction Brief", filed Jul. 7, 2008 in United States District Court, Northern District of California, San Francisco Division, Case No. 3:07-CV-06053-EDL, 43 pages.
"Plaintiff NetApp, Inc's Opening Claim Construction Brief", filed Jul. 7, 2008 in United States District Court, Northern District of California, San Francisco Division, Case No. 3:07-CV-06053-EDL, 41 pages.
"Sun Microsystems, Inc.'s Responsive Claim Construction Brief", filed Jul. 21, 2008 in United States District Court, Northern District of California, San Francisco Division, Case No. 3:07-CV-06053-EDL, 49 pages.
"NetApp, Inc.'s Reply to Sun Microsystems, Inc.'s Responsive Claim Construction Brief", filed Aug. 1, 2008 in United States District Court, Northern District of California, San Francisco Division, Case No. 3:07-CV-06053-EDL, 29 pages.
"Sun Microsystems, Inc.'s Reply Claim Construction Brief", filed Aug. 1, 2008 in United States District Court, Northern District of California, San Francisco Division, Case No. 3:07-CV-06053-EDL, 41 pages.
"Order Construing Claims", filed Sep. 10, 2008 in United States District Court, Northern District of California, San Francisco Division, Case No. 3:07-CV-06053-EDL, 60 pages.
"Further Order Construing Claims", filed Sep. 29, 2008 in United States District Court, Northern District of California, San Francisco Division, Case No. 3:07-CV-06053-EDL, 2 pages.
Joint Report RE: Claim Construction of "Incore Root Inode", filed Nov. 5, 2008 in United States District Court, Northern District of California, San Francisco Division, Case No. 3:07-CV-06053-EDL, 2 pages.

Leffler, et al. The Design and Implementation of 4.3BSD UNIX Operating System, Addison-Wesley Publishing Company, Copyright 1989, p. vii, 203-205.
Network Appliance, Inc.'s Objections and Responses to Sun Microsystem, Inc.'s First Set of Document Requests, *Network Appliance, Inc.*, v. *Sun Microsystems, Inc.*, Case No. 3:07-CV-06053-EDL, Jan. 22, 2008, 133 pages.
Network Appliance, Inc.'s Objections and Responses to Sun Microsystem, Inc.'s First Set of Interrogatories, *Network Appliance, Inc.*, v. *Sun Microsystems, Inc.*, Case No. 3:07-CV-06053-EDL, Jan. 22, 2008, 21 pages.
Network Appliance, Inc.'s Objections and Responses to Sun Microsystem, Inc.'s Second Set of Document Requests, *Network Appliance, Inc.*, v. *Sun Microsystems, Inc.*, Case No. 3:07-CV-06053-EDL, Mar. 20, 2008, 44 pages.
NetApp's Objections and Responses to Sun Microsystem, Inc.'s Third Set of Document Requests, *Network Appliance, Inc.*, v. *Sun Microsystems, Inc.*, Case No. 3:07-CV-06053-EDL, May 5, 2008, 51 pages.
NetApp's Objections and Responses to Sun Microsystem, Inc.'s Second Set of Interrogatories, *Network Appliance, Inc.*, v. *Sun Microsystems, Inc.*, Case No. 3:07-CV-06053-EDL, May 5, 2008, 7 pages.
Network Appliance, Inc., International Application No. PCT/US03/17497, International Filing Date: Jun. 3, 2003, PCT Notification of Transmittal of the International Preliminary Examination Report, Date of Mailing: Feb. 4, 2004, 4 pages.
Agrawal, Rakesh and Dewitt, David J., "Integrated Concurrency Control and Recovery Mechanisms: Design and Performance Evaluation," ACM Transactions on Database Systems, vol. 10, No. 4, Dec. 1985, 36 pages.
Bach, Maurice J., "The Design of the UNIX Operating System," Chapter 4: Internal Representation of Files, Prentice Hall, 1990, 31 pages.
Bach, Maurice J., "The Design of the UNIX Operating System," Chapter 5: System Calls for the File System, Prentice Hall, 1990, pp. 91-145.
Baker, Mary, et al., "Non-Volatile Memory for Fast, Reliable File Systems," ACM, 1992, 13 pages.
Borg, Anita, et al., "Fault Tolerance Under UNIX," ACM Transactions on Computer Systems, vol. 7, No. 1, Feb. 1989, 24 pages.
Dion, "The Cambridge File Server," ACM SIGOPS, Operating Systems Review, vol. 14, No. 4, 1980, pp. 26-35.
Fridrich, et al., "The Felix File Server," ACM 0-89791-062-1-12/81-0037, 1981, pp. 37-44.
Gait, Jason, "The Optical File Cabinet: A Random-Access File System for Write-Once Optical Disks", IEEE Computer, Jun. 1988, pp. 11-22.
Gait, J., "A Checkpointing Page Store for Write-Once Optical Disk, " IEEE Transactions on Computers, vol. 39, No. 1, Jan. 1990, pp. 2-9.
Gait, J., "Phoenix: A Safe In-Memory File System," Communications of the ACM, vol. 33, No. 1, Jan. 1990, pp. 81-86.
Gray, Jim, et al., "The Recovery Manager of the System R Database Manager," ACM Computing Surveys, vol. 13, No. 2, Jun. 1981, 20 pages.
Hagmann, Robert, "Reimplementing the Cedar File System Using Logging and Group Commit," ACM, 1987, 8 pages.
Hecht, Matthew S. and Gabbe, John D., "Shadowed Management of Free Disk Pages with a Linked List," ACM Transactions on Database Systems, vol. 8, No. 4, Dec. 1983, 12 pages.
Kent, Jack Marshall, "Performance and Implementation Issues in Database Crash Recovery," Princeton University Dissertation, Oct. 1985, 210 pages.
Lampson, Butler W. and Sturgis, Howard E., "Crash Recovery in a Distributed Data Storage System," Jun. 1979, 28 pages.
Landau, Charles R., "The Checkpoint Mechanism in KeyKOS," IEEE, 1992, 6 pages.
Murphy, Daniel L., "Storage Organization and Management in TENEX," Fall Joint Computer Conference, 1972, 12 pages.
Ousterhout, John, "Beating the I/O Bottleneck: A Case for Log-Structured File System," Oct. 1988, 19 pages.

Popek, Gerald J. and Walker, Bruce J., "The LOCUS Distributed System Architecture," 1985, Cataloged May 1986, The MIT Press, Cambridge, MA.

Popek, Gerald J. and Walker, Bruce J., "The LOCUS Distributed System Architecture," Chapter 3, 1985, Cataloged May 1986, The MIT Press, Cambridge, MA, 48 pages.

Quinlan, Sean, "A Cached WORM File System," Software—Practice and Experience, vol. 21, No. 12, Dec. 1991, 11 pages.

Rosenblum, Mendel and Ousterhout, John K., "The LFS Storage Manager," USENIX Technical Conference, Anaheim, CA, Jun. 1990, 16 pages (SUN00006851-SUN00006866).

Rosenblum, Mendel and Ousterhout, John K., "The Design and Implementation of a Log-Structured File System," Jul. 1991, 15 pages (SUN00006867-SUN00006881).

Rosenblum, Mendel and Ousterhout, John K., "The Design and Implementation of a Log-Structured File System," Jul. 1991, 15 pages (SUN00007382-SUN00007396).

Rosenblum, Mendel and Ousterhout, John K., "The LFS Storage Manager," USENIX Technical Conference, Anaheim, CA, Jun. 1990, 16 pages (SUN 00007397-SUN00007412).

Rosenblum, Mendel, "The Design and Implementation of a Log-Structured File System," UC Berkeley, 1992, 100 pages.

Salem, Kenneth and Garcia-Molina, Hector, "Checkpointing Memory—Resident Database," IEEE 1989, 11 pages.

Schilling, Jorg, "Design and Implementation of a Fast File System for UNIX with Special Consideration of Technical Parameters of Optical Storage Media and Multimedia Applications," Technical University of Berlin Thesis, May 1991, 119 pages.

Schilling, Jorg, "Entwurf und Implementierung eines Schnellen Filesystems fur UNIX Unter Besonderer Berucksichtigung der Technischen Parameter Optischer Speichermedien und Multimedialer Anwendungen," Matrikel-Nr. 45181. 118 pages.

Seltzer, Margo and Stonebraker, Michael, "Transaction Support in Read Optimized and Write Optimized File Systems," Proceedings of the 16th VLDB Conference, 1990, 12 pages.

Seltzer, Margo Ilene, "File System Performance and Transaction Support," University of California at Berkeley Dissertation, 1992, 131 pages.

Seltzer, Margo, et al., "An Implementation of a Log-Structured File System for UNIX," 1993 Winter USENIX, Jan. 1993, San Diego, CA, 18 pages.

Sidebotham, "Volumes: The Andrew File System Data structuring Primitive," EUUG Conference Proceedings, Manchester, UK, 1986, pp. 1-8.

Singhal, Vivek, et al., "Texas: An Efficient, Portable Persistent Store," Proceedings of the Fifth International Workshop on Persistent Object Systems, San Miniato, Pisa), Italy, Sep. 1992, 25 pages.

Svobodova, "File Servers for Network-Based Distributed Systems," ACM Computing Surveys, vol. 16, No. 4, 1984, pp. 353-398.

Walker, Bruce, et al., "The LOCUS Distributed Operating System," ACM, 1983, 22 pages.

*Network Appliance, Inc.* v. *Sun Microsystems, Inc.*, "Network Appliance's Patent Local Rule 3-1 Disclosure of Asserted Claims and Preliminary Infringement Contentions for U.S. Patent No. 5,819,292," filed Jan. 22, 2008 in the United States District Court Northern District of California San Francisco Division, Case No. 3:07-CV-06053-EDL, 6 pages.

*Network Appliance, Inc.* v. *Sun Microsystems, Inc.*, "Network Appliance's Patent Local Rule 3-1 Disclosure of Asserted Claims and Preliminary Infringement Contentions for U.S. Patent No. 6,892,211," filed Jan. 22, 2008 in the United States District Court Northern District of California San Francisco Division, Case No. 3:07-CV-06053-EDL, 8 pages.

*Network Appliance, Inc.* v. *Sun Microsystems, Inc.*, "Defendant-Counterclaim Plaintiff Sun Microsystems, Inc.'s Preliminary Invalidity Contentions and Accompanying Document Production for U.S. Patent No. 6,892,211 [Patent L.R. 3-3 and 3-4]," filed Mar. 6, 2008 in the United States District Court Northern District of California San Francisco Division, Case No. 3:07-CV-06053-EDL, 173 pages.

*Network Appliance, Inc.* v. *Sun Microsystems, Inc.*, "Defendant-Counterclaim Plaintiff Sun Microsystems, Inc.'s Preliminary Invalidity Contentions and Accompanying Document Production for U.S. Patent No. 5,819,292 [Patent L.R. 3-3 and 3-4]," filed Mar. 6, 2008 in the United States District Court Northern District of California San Francisco Division, Case No. 3:07-CV-06053-EDL, 40 pages.

*Network Appliance, Inc.* v. *Sun Microsystems, Inc.*, "Order Granting in Part and Denying in Part Sun's Motion for Partial Stay of the Case Pending Reexamination; Overruling Evidentiary Objections; Denying in Part and Granting in Part Motions to Seal", dated May 23, 2008 in United States District Court for the Northern District of California, San Francisco Division. Case No. CV-07-06053-EDL, 9 pages.

*Network Appliance, Inc.* v. *Sun Microsystems, Inc.*, "Sun Microsystems, Inc.'s Local Rule 3-6 Invalidity Contentions For U.S. Patent No. 6,892,211", dated Nov. 10, 2008 in United States District Court for the Northern District of California, San Francisco Division. Case No. 3:07-CV-06053-EDL, 108 pages including Exhibits.

*Network Appliance, Inc.* v. *Sun Microsystems, Inc.*, "Sun Microsystems, Inc.'s Local Rule 3-6 Invalidity Contentions for U.S. Patent No. 5,819,292", dated Nov. 19, 2008 in United States District Court for the Northern District of California, San Francisco Division. Case No. 3:07-CV-06053-EDL, 72 pages including Exhibits.

*Network Appliance, Inc.* v. *Sun Microsystems, Inc.*, "Defendant Sun Microsystems, Inc.'s Amended Answer and Counterclaim to Plaintiff Network Appliance, Inc.'s Complaint for Patent Infringement", dated Mar. 24, 2009 in United States District Court for the Northern District of California, San Francisco Division. Case No. 3:07-CV-06053-EDL, 58 pages.

"NetApp, Inc.'s Amended Reply to Sun's Amended Answer and Counterclaims", filed Apr. 2, 2009 in United States District Court for the Northern District of California, San Francisco Division, Case No. 3:07-CV-06053-EDL, 40 pages.

"Transmittal of Communication to Third Party Requester Inter Partes Reexamination" and "Order Granting Reexamination Request", issued by the United States Patent and Trademark Office, Reexamination Control No. 95/000,324 of Patent No. 6,857,001, mailed Apr. 2008, 52 pages.

"Amendment", United States Patent and Trademark Office, Reexamination Control No. 95/000,324 of Patent No. 6,857,001, filed Jun. 4, 2008, 43 pages.

"Third Party Requester's Comments to Patent Owner's Response to Office Action mailed on Apr. 4, 2008 in Inter-Partes Re-Examination of U.S. Patent No. 6,857,001", United States Patent and Trademark Office, Reexamination Control No. 95/000,324 of Patent No. 6,857,001, filed Jul. 7, 2008, 115 pages.

"Amendment to Correct Non-Compliant Amendment", United States Patent and Trademark Office, Reexamination Control No. 95/000,324 of Patent No. 6,857,001, filed Apr. 10, 2009, 44 pages.

"Third Party Requester's Comments to Patent Owner's Response to Office Action mailed on Apr. 4, 2008 in Inter-Partes Re-Examination of U.S. Patent No. 6,857,001", United States Patent and Trademark Office, Reexamination Control No. 95/000,324 of Patent No. 6,857,001, filed Apr. 27, 2009, 116 pages.

"Action Closing Prosecution", issued by United States Patent and Trademark Office, Reexamination Control No. 95/000,324 of Patent No. 6,857,001, mailed Jun. 19, 2009, 42 pages.

"Amendment in Response to Action Closing Prosecution (37 C.F.R. §1.949)", United States Patent and Trademark Office, Reexamination Control No. 95/000,324 of Patent No. 6,857,001, filed Jul. 20, 2009, 55 pages.

"NetApp, Inc.'s Second Amended Reply to Sun's Amended Answer and Counterclaims", filed Sep. 9, 2009 in United States District Court, Northern District of California, San Francisco Division, Case No. 3:07-CV-06053-EDL, 40 pages.

"Third Party Requester's Comments to Patent Owner's Response to ACP, dated Jun. 19, 2009 in Inter-Partes Re-Examination of U.S. Patent No. 6,857,001", United States Patent and Trademark Office, Reexamination Control No. 95/000,324 of Patent No. 6,857,001, filed Aug. 18, 2009, 22 pages.

"Transmittal of Communication to Third Party Requester Inter Partes Reexamination", Mailed Mar. 11, 2010 from the United States Patent and Trademark Office, Reexamination Control No. 95/000,324 of Patent No. 6,857,001, 31 pages.

"Notice of Appeal", Filed Apr. 9, 2010 in the United States Patent and Trademark Office, Reexamination Control No. 95/000,324 of Patent No. 6,857,001, 2 pages.

"Stipulated Dismissal Without Prejudice and Order", filed Sep. 8, 2010 in United States District Court for the Northern District of California, San Fransisco Division, Case No. 3:07-cv-06053-EDL, 2 pages.

Leffler, S. et al., The File System, The Design and Implementation of the 4.3BSD UNIX Operating System, Chapter 7, Addison-Wesley Publishing Company, Inc., Oct. 1989, 37 pages.

Ylonen, T., Concurrent Shadow Paging: A New Direction for Database Research, Helsinki University Technology, SF-02150 Espoo, Finland, 1992, 9 pages.

* cited by examiner

MULTIPLE CONCURRENT ACTIVE FILE SYSTEMS

CROSS-REFERENCE TO RELATED APPLICATIONS

The present application is a continuation of U.S. patent application Ser. No. 11/057,409, which was filed on Feb. 14, 2005 and is now issued as U.S. Pat. No. 7,685,169 on Mar. 23, 2010, by David Hitz et al. for MULTIPLE CONCURRENT ACTIVE FILE SYSTEMS, which is a continuation of U.S. patent application Ser. No. 10/165,188, which was filed on Jun. 7, 2002 and is now issued as U.S. Pat. No. 6,857,001 on Feb. 15, 2005. Both applications are hereby incorporated by reference.

BACKGROUND OF THE INVENTION

1. Field of the Invention

This invention relates to multiple concurrent writeable file systems.

2. Description of the Related Art

A file system provides a structure for storing information, for example application programs, file system information, other data, etc. (hereinafter collectively referred to as simply data) on storage devices such as disk drives, CD-ROM drives, etc. One problem with many file systems is that if the file system is damaged somehow, a large quantity of data can be lost.

In order to prevent such loss of data, backups are often created of a file system. One very efficient method for creating a backup of a file system is to create a snapshot of the file system. A snapshot is an image of the file system at a consistency point, a point at which the file system is self-consistent. A file system is self-consistent if the data stored therein constitutes a valid file system image.

In some file systems, for example Write Anywhere File System Layout (WAFL) file systems, a snapshot of a file system can be created by copying information regarding the organization of data in the file system. Then, as long as the data itself is preserved on the storage device, the data can be accessed through the snapshot. A mechanism is provided in these file systems for preserving this data, for example through a block map.

Conventionally, snapshots are read-only. A read-only snapshot can be used to recall previous versions of data and to repair damage to a file system. These capabilities can be extremely useful. However, these types of snapshots do not provide certain other capabilities that might be useful.

SUMMARY OF THE INVENTION

It would be advantageous if snapshots could be written to as well, so that a user desiring to modify a snapshot could do so. This would have several advantages:

It would become possible to correct an erroneous entry that had been memorialized in a snapshot.

It would become possible to delete material that was desired to be purged from the file system.

It would become possible to make changes to an "experimental" version of the file system (or on data maintained by the file system). An "experimental" version of the file system would be a version of the file system for which catastrophic errors would not cause loss of data in a "real" active version of the file system.

It would become possible to reverse erroneous upgrades to operation of the file system, or to operation of some programs or databases operating under the aegis of that file system.

A writable snapshot is actually another active file system. Because this active file system is based on data from another active file system, experimental modifications and changes for the active file system can be made to the writable snapshot without risking harm to the original active file system. In addition, because a snapshot can be created by simply copying organizational information and preserving existing data, writable snapshots (i.e. new active file systems) can be created easily and with utilization of few system resources.

These advantages and others are provided in an embodiment of the invention, described herein, in which plural active file systems are maintained, wherein each of the active file systems initially access data shared with another of the active file systems, and wherein changes made to each of the active file systems are not reflected in other active file systems.

In the preferred embodiment, when a second active file system is created based on a first active file system, the first active file system and the second active file system initially share data. When changes are made to the first active file system, modified data is recorded in the first active file system in a location that is not shared with the second active file system. When changes are made to the second active file system, modified data is recorded in the second active file system in a location that is not shared with the first active file system.

Further snapshots preferably are made of ones of the plural active file systems, each snapshot forming an image of its respective active file system at a past consistency point. Each snapshot includes a complete hierarchy for file system data, separate and apart from active file system data for the plural active file systems. One of these snapshots in turn can be converted into a new active file system by making the snapshot writable and by severing snapshot pointers from any of the active file systems to the new active file system.

The invention also encompasses memories that include instructions for performing the foregoing operations and storage systems that implement those operations.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Related Applications

Figure 1:
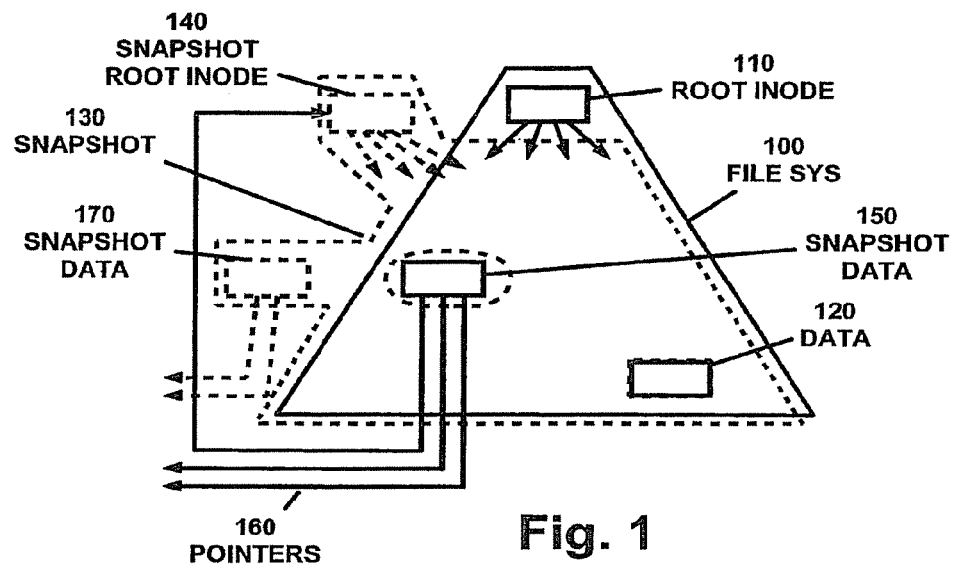
FIG. 1 illustrates creation of a snapshot that can be converted into an active file system according to the invention.

Inventions described herein can be used in conjunction with inventions described in the following documents:

U.S. patent application Ser. No. 09/642,061, filed Aug. 18, 2000, in the name of inventors Lewis, Edwards and Viswanathan, now issued as U.S. Pat. No. 7,072,916 on Jul. 4, 2006, titled "Instant Snapshot."

U.S. patent application Ser. No. 09/932,578, filed Aug. 17, 2001, in the name of inventors Lewis, Edwards and Viswanathan, now issued as U.S. Pat. No. 7,454,445 on Nov. 18, 2008, titled "Instant Snapshot."

U.S. patent application Ser. No. 08/071,643, filed Jun. 3, 1993, in the name of inventors Hitz, Malcolm, Lau and Rakitzis, titled "Write Anywhere File-System Layout," now abandoned.

U.S. patent application Ser. No. 08/454,921, filed May 31, 1995, in the name of inventors Hitz, Malcolm, Lau and Rakitzis, titled "Write Anywhere File-System Layout," now U.S. Pat. No. 5,819,292.

U.S. patent application Ser. No. 09/108,022, filed Jun. 30, 1998, in the name of inventors Hitz, Malcolm, Lau and Rakitzis, titled "Write Anywhere File-System Layout," now U.S. Pat. No. 5,963,962.

U.S. patent application Ser. No. 09/153,094, filed Sep. 14, 1998, in the name of inventors Ritz, Malcolm, Lau and Rakitzis, titled "Write Anywhere File-System Layout," now U.S. Pat. No. 6,289,356 B1.

U.S. patent application Ser. No. 09/954,522, filed Sep. 11, 2001, in the name of inventors Ritz, Malcolm, Lau and Rakitzis, now issued as U.S. Pat. No. 6,721,764 on Apr. 13, 2004, titled "Write Anywhere File-System Layout."

U.S. patent application Ser. No. 09/642,065, filed Aug. 18, 2000, in the name of inventors Doucette, Lewis and Edwards, now issued as U.S. Pat. No. 6,636,879 on Oct. 21, 2003, titled "Improved Space Allocation in a Write Anywhere File System."

These documents are hereby incorporated by reference as if fully set forth herein. These documents are referred to as the "incorporated disclosures".

Changes to the file system are tightly controlled to maintain the file system in a consistent state. The file system progresses from one self-consistent state to another self-consistent state. The set of self-consistent blocks on disk that is rooted by the root inode is referred to as a consistency point (CP). To implement consistency points, WAFL always writes new data to unallocated blocks on disk. It never overwrites existing data. A new consistency point occurs when the fsinfo block is updated by writing a new root inode for the inode file into it. Thus, as long as the root inode is not updated, the state of the file system represented on disk does not change.

The present invention also creates snapshots, which are virtual read-only copies of the file system. A snapshot uses no disk space when it is initially created. It is designed so that many different snapshots can be created for the same file system. Unlike prior art file systems that create a clone by duplicating the entire inode file and all of the indirect blocks, the present invention duplicates only the inode that describes the inode file. Thus, the actual disk space required for a snapshot is only the 128 bytes used to store the duplicated inode. The 128 bytes of the present invention required for a snapshot is significantly less than the many megabytes used for a clone in the prior art.

The present invention prevents new data written to the active file system from overwriting "old" data that is part of a snapshot(s). It is necessary that old data not be overwritten as long as it is part of a snapshot. This is accomplished by using a multi-bit free-block map. Most prior art file systems use a free block map having a single bit per block to indicate whether or not a block is allocated. The present invention uses a block map having 32-bit entries. A first bit indicates whether a block is used by the active file system, and 20 remaining bits are used for up to 20 snapshots, however, some bits of the 31 bits may be used for other purposes.

Lexicography

The following terms refer or relate to aspects of the invention as described below. The descriptions of general meanings of these terms are not intended to be limiting, only illustrative.

data—In general, any information. With regard to a storage device or file system, any information stored in the storage device or file system, including but not limited to application programs and data, multimedia data, organizational data for the storage device or file system, etc.

organizational data—In general, data that specifies the layout of other data in a file system. In a Write Anywhere File system Layout (WAFL) design, the organizational data includes a root inode that points either directly or indirectly (i.e., through other inodes) to blocks of data for all files in the file system. In a WAFL design, all data including the organizational data (and thus root inode and other inodes) are stored in blocks.

inode—In general, an information node. In a W AFL design, an information node that contains data about other blocks in the file system.

self-consistent (in the context of a file system)—In general, a file system is self-consistent when the data stored in the file system, including data about the organization of the file system, constitutes a valid file system image.

consistency point—In general, a consistency point refers either to (a) a time when a file system is self-consistent; or to (b) a set of data in a file system at a time of a consistency point.

snapshot—In general, a snapshot is a written record of the data maintained by the file system at a time of a consistency point. Although in a preferred embodiment, each snapshot is both (a) maintained in a format similar to the active file system and (b) is referenceable using the file system namespace, there is no particular limitation of the invention to require either of those conditions.

active file system—In general, an active file system is a set of data that can be accessed and modified.

file system hierarchy—In general, a file system hierarchy refers to either (a) an organization of data into a namespace, or (b) a set of data blocks and their interconnections used to record and access information, whether data or metadata, being maintained on a storage device.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

Snapshots and Active File Systems

FIG. 1 illustrates creation of a snapshot that can be converted into an active file system according to the invention.

File system 100 in FIG. 1 resides on one or more storage devices, for example hard disk drives, CD-ROMs, or other devices. In a preferred embodiment, file system 100 is a W AFL system, although this does not have to be the case. W AFL file systems are described in detail in the incorporated disclosures.

File system 100 includes root inode 110 and data 120, as well as other data. All of the inodes and data in file system 100 preferably are stored in blocks, although this also does not have to be the case.

Root inode 110 stores parts of the organizational data for file system 100. In particular, root inode 110 points to data and to other inodes and data that in turn point to data for all information stored in file system 100. Thus, any information stored in a file system 100 can be reached by starting at root inode 110.

Snapshot 130 has been formed from file system 100. In FIG. 1, elements of snapshot 130 are shown using dashed lines to assist in distinguishing those elements from file system 100. According to a preferred embodiment of the invention, the snapshot can be formed by simply copying root inode 110 to snapshot root inode 140 at a consistency point for file system 100. In some embodiments, additional organizational data may have to be copied. Then, as long as all of the data and inodes pointed to by root inode 110 (and any other copied organizational data) are preserved, snapshot root inode 140 will point to a valid copy of file system 100.

After snapshot root inode 140 has been created, snapshot 130 and file system 100 actually share data on the storage device or devices. Thus, snapshot 130 preferably includes the same physical data 120 on the storage device or devices as file system 100, as indicated by the duel solid and dashed borders around data 120 in FIG. 1. In other words, the snapshot and the file system overlap. This allows for rapid creation of snapshot 130 with efficient use of storage space and other system resources.

File system 100 preferably includes snapshot data 150 that points to snapshots of file system 100. In particular, pointers 160 in the snapshot data preferably point to root inodes of those snapshots.

Snapshot 130 also preferably includes snapshot data 170 that points to other snapshots. However, snapshot data 170 of snapshot 130 can be different from snapshot data 150 of file system 100 because snapshot 130 preferably does not point to itself. This difference is shown in FIG. 1 by the cutout of snapshot 130 around snapshot data 150 in file system 100.

Preferably, a snapshot of a file system according to the invention includes a complete hierarchy for file system data, separate and apart from active file system data for the active file systems. This hierarchy is included in the root inode for the snapshot and possibly in other nodes and data copied for the snapshot (not shown).

There is no particular requirement for the file system hierarchies for a snapshot to duplicate the name space originally used for the associated active file system. In one preferred embodiment, file names in a snapshot's root inode (and other organizational data) can be compressed using a hash code or other technique, so as to minimize the organizational data that must be stored for each snapshot. However, in an alternative embodiment, in some circumstances possibly preferable, it might be superior to maintain the original name space and other organizational data for each snapshot in a form relatively easy to read by a human user. This might have the salutary effect of aiding human users with backup and restore operations based on such snapshots.

Figure 2:
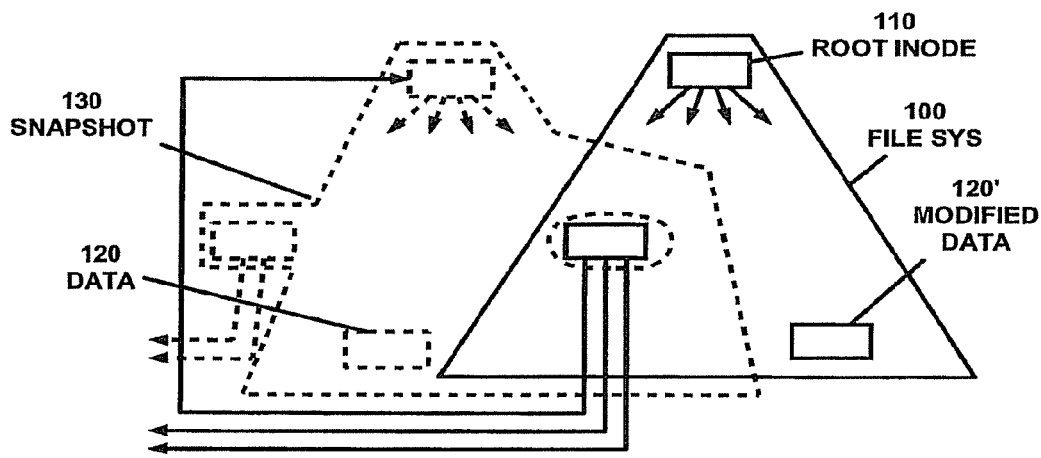
FIG. 2 illustrates divergence of an active file system from a snapshot of that file system.

FIG. 2 illustrates divergence of an active file system from a snapshot of that file system.

Because file system 100 is active, a mechanism must be provided for changing data in the file system. However, in order to maintain the integrity of snapshot 130, data pointed to by snapshot root inode 140 must be preserved. Thus, for example, when data 120 is changed in file system 100, modified data 120' is stored in the storage device or devices. Root inode 110 of file system 100 and any intervening inodes and organizational data are updated to point to modified data 120'. In addition, the unmodified data 120 is preserved on the storage device or devices. Snapshot root inode 140 continues to point to this unmodified data, thereby preserving the integrity of snapshot 130.

Likewise, when data is deleted from active file system 100, pointers to that data are removed from the file system. However, the data itself is preserved if it is included in snapshot 130. (This data can actually be deleted when the snapshot itself is removed.)

In actual practice, changes to root inode 110, other inodes, and data for many changes to file system 100 are accumulated before being written to the storage device or devices. After such changes have been written, file system 100 is self-consistent (i.e., at a consistency point). Preferably, snapshots are only made at such consistency point.

According to the invention, snapshot 130 can be converted into a new active file system by making the snapshot writable. In order to modify data in a writable snapshot 130, modified data is written to the storage device or devices. Root inode 140 and any intervening inodes and organizational data pointing to the modified data are updated. Furthermore, an unmodified copy of the data is preserved if it is still included in file system 100. This process is substantially identical to the process that occurs when modifications are made to file system 100, only the unmodified data that is preserved is data pointed to by root inode 110.

In other words, when changes are made to the first active file system (e.g., file system 100), modified data is recorded in the first active file system in a location that is not shared with the second active file system (e.g., writable snapshot 130). Likewise, when changes are made to the second active file system, modified data is recorded in the second active file system in a location that is not shared with the first active file system. As a result, changes made to the first active file system not reflected in the second active file system, and changes made to the second active file system not reflected in the first active file system.

When created, snapshot 130 substantially overlaps file system 100. If the snapshot is made writable shortly after its creation, the new active file system formed by the writable snapshot will initially share almost all of its data with the existing active file system. As a result, the invention allows for creation of an entire new active file system with efficient utilization of resources such as processing time and storage space.

The process of storing modified data and preserving unmodified data causes file system 100 and snapshot 130 (whether read-only or writable) to diverge from one another.

This divergence is representationally shown in FIG. 2 by a reduction in overlap between file system 100 and snapshot 130.

Figure 3:
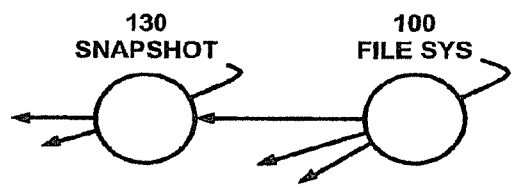
FIG. 3 illustrates the relationship between the active file system and the snapshot in FIG. 2.

FIG. 3 illustrates the relationship between the active file system and the snapshot in FIG. 2. This type of diagram provides a simplified view of the relationship between file systems and their snapshots. In FIG. 3, file system 100 points to snapshot 130. In addition, both file system 100 and snapshot 130 point to other snapshots (not shown).

Figure 4:
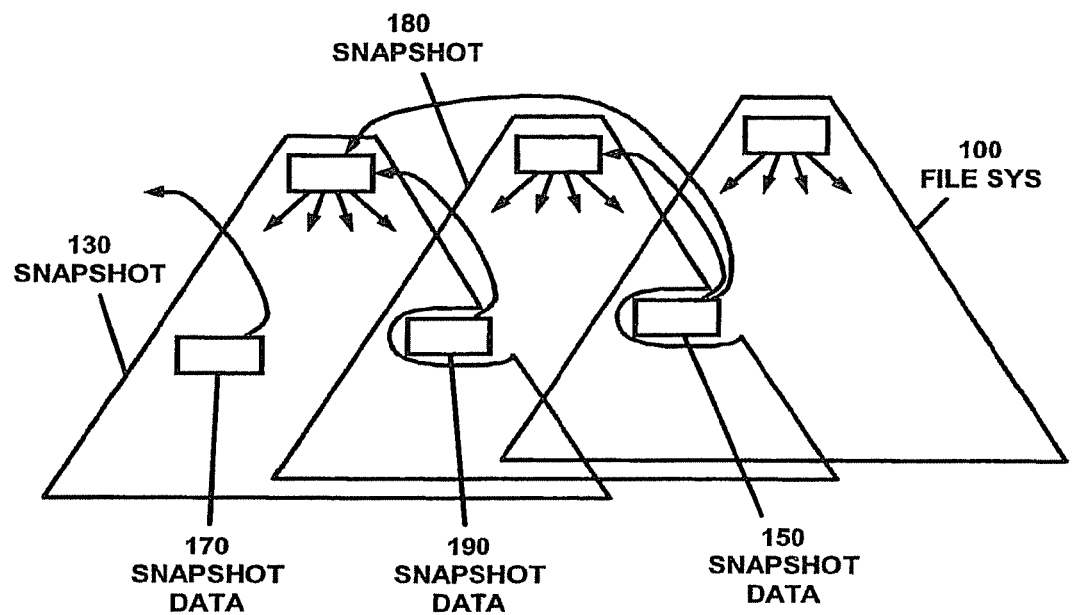
FIG. 4 illustrates a chain of snapshots that can be converted into active file systems according to the invention.

FIG. 4 illustrates a chain of snapshots that can be converted into active file systems according to the invention. In this figure, second snapshot 180 has been created from file system 100. Because snapshot 100 still pointed to snapshot 130 at the time of the creation of the second snapshot, snapshot 180 includes snapshot data 190 that points to snapshot 130.

Either or both of snapshots 130 and 180 can be turned into active file systems by making those snapshots writable. As a data is written to any of the active file systems (i.e., file system 100, writable snapshot 130, or writable snapshot 180), the file systems will diverge from one another.

Figure 5:
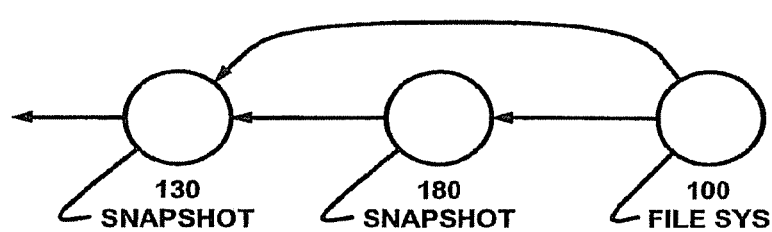
FIG. 5 illustrates the relationship between the active file system and the snapshots in FIG. 4.

FIG. 5 illustrates the relationship between the active file system and the snapshots in FIG. 4. In FIG. 5, file system 100 points to snapshots 130 and 180. Likewise, snapshot 180 points to snapshot 130, which in turn can point to another snapshot or snapshots.

Figure 6:
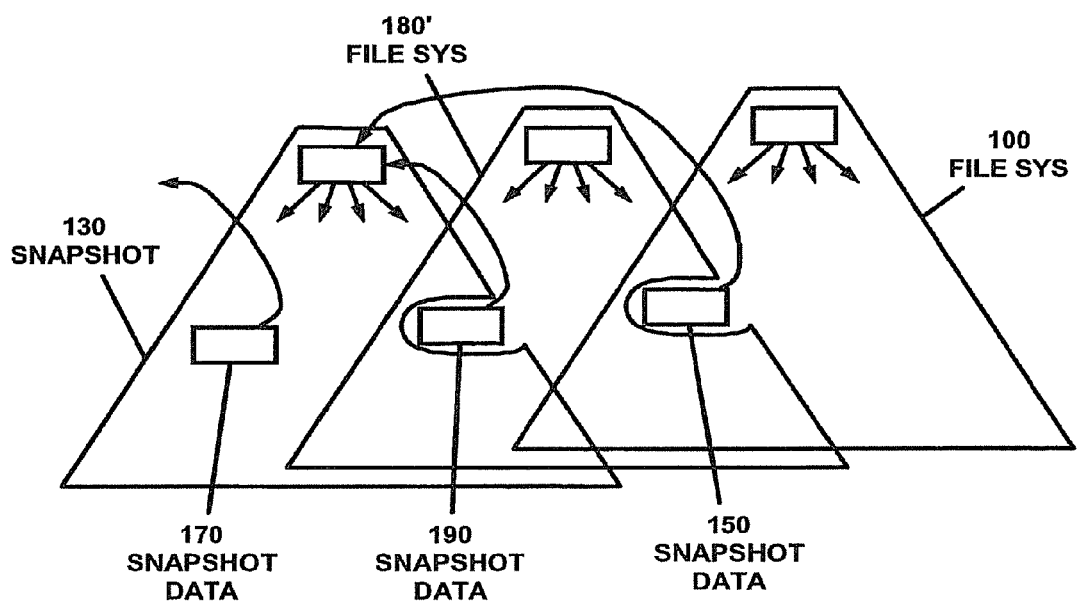
FIG. 6 illustrates a snapshot that has been converted into an active file system according to the invention.

FIG. 6 illustrates a snapshot that has been converted into an active file system according to the invention. In this figure, snapshot 180 has been turned into active file system 180' by being made writable. Because this new active file system can be modified, it no longer represents a true snapshot of file system 100. As a result, the snapshot pointer to snapshot 180 in snapshot data 150 of file system 100 has been severed, for example by being deleted.

Figure 7:
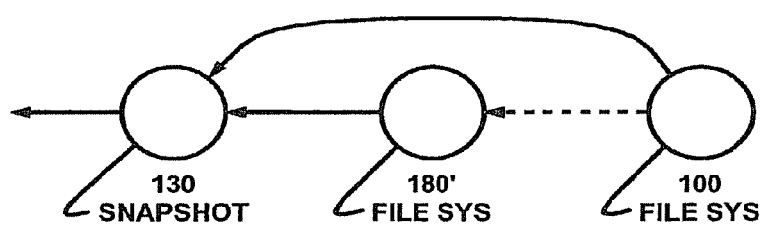
FIG. 7 illustrates the relationship between the active file system, new active file system, and snapshot in FIG. 6.

FIG. 7 illustrates the relationship between the active file system, new active file system, and snapshot in FIG. 6. In this figure, active file system 100 points to snapshot 130. Likewise, active file system 180' also points to snapshot 130. As discussed above, file system 100 preferably no longer includes a snapshot pointer to snapshot 180. However, file system 100 can still included a pointer to file system 180', for example to allow traversal from one file system to the other. This inter-file-system pointer is shown as a dashed line in FIG. 7 to distinguish it from a snapshot pointer.

Figure 8:
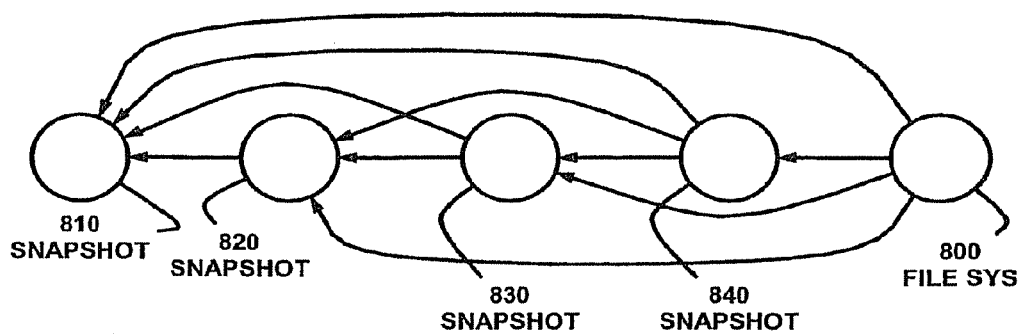
FIG. 8 illustrates a more complex chain of snapshots that can be converted into active file systems according to the invention.

FIG. 8 illustrates a more complex chain of snapshots that can be converted into active file systems according to the invention. In FIG. 8, file system 800 is an active file system. Four snapshots have been made of this file system. Snapshot 810 is the oldest, snapshot 820 is the next oldest, snapshot 830 is the next oldest after its snapshot 820, and snapshot 840 is the newest. Any snapshots older than snapshot 810 have been deleted, thereby freeing up storage space that was occupied by data that was not overlapped by any of the other snapshots or the active file system. Each of snapshots 810 to 840 can be turned into an active file system by being made writable.

Figure 9:
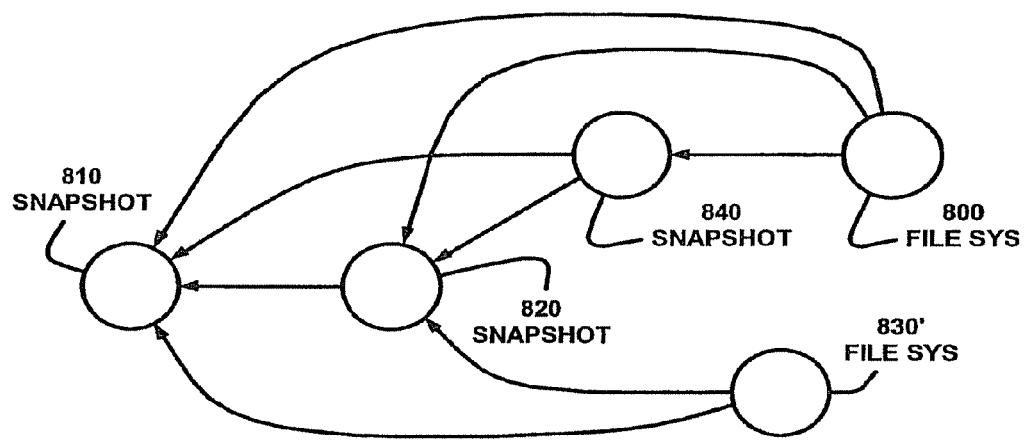
FIG. 9 illustrates the chain shown in FIG. 8 with one of the snapshots converted into an active file system according to the invention.

FIG. 9 illustrates the chain shown in FIG. 8 with one of the snapshot converted into an active file system according to the invention.

In FIG. 9, snapshot 830 has been converted into active file system 830' in which data can be modified, added, and deleted. As a result, file system 800 preferably no longer points to snapshot 830 as a snapshot. Active file system 830' can continue to point to snapshots 810 and 820.

Figure 10:
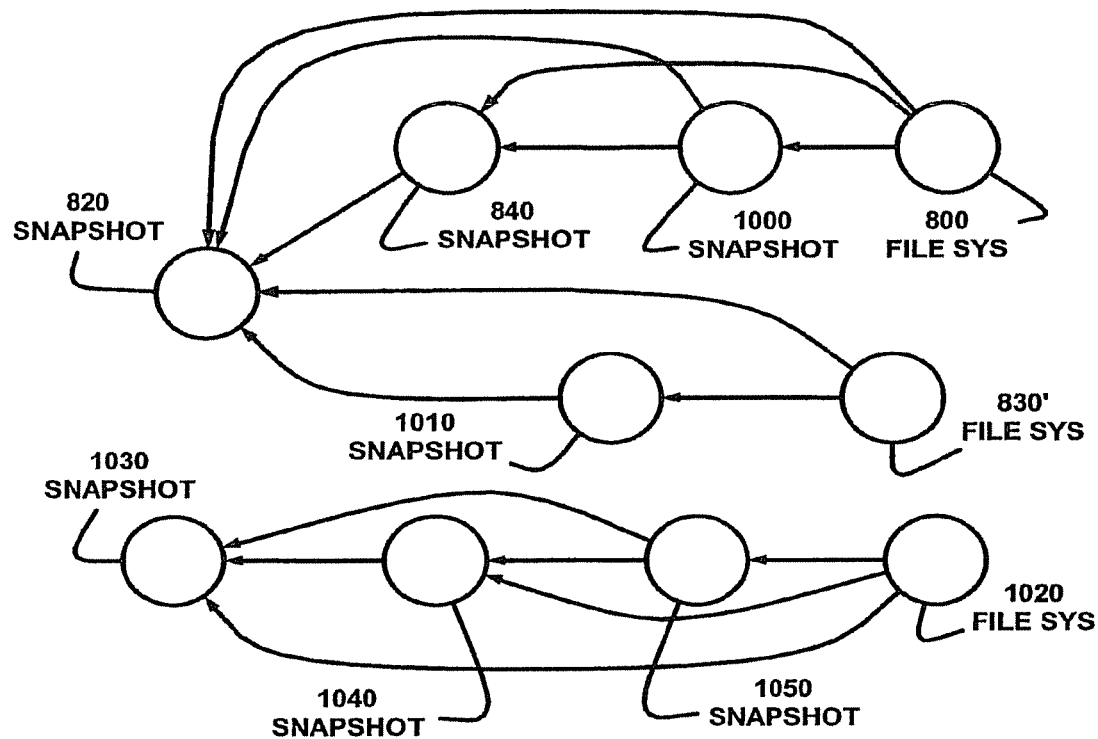
FIG. 10 illustrates some more possible relationships between plural active file systems and their associated snapshots according to the invention.

FIG. 10 illustrates some more possible relationships between plural active file systems and their associated snapshots according to the invention.

The top portion of FIG. 10 corresponds to FIG. 9, except that additional snapshots have been made from the active file systems. Thus, snapshot 1000 has been made of file system 800, and snapshot 1010 has been made of file system 830'. In addition, snapshot 810 has been deleted to free up space on the storage device or devices.

Both of active file systems 800 and 830' can trace back to a common snapshot 820. However, when that snapshot is deleted, the active file systems will no longer share a common snapshot. This situation has occurred with respect to file system 1020 and snapshots 1030 to 1050. This arrangement illustrates that it is possible to have a "forest" (i.e., a collection of unconnected trees) formed by the links between active file systems and their associated snapshots, all on one storage device or set of storage devices. Despite the fact that the file systems and their snapshots no longer point to a common snapshot, these snapshots and even the active file systems could still share some data (i.e., overlap), thereby preserving the efficiency of the invention.

In the foregoing discussion, new active file systems are created from snapshots. However, the invention does not require the actual creation of a snapshot in order to create a new active file system. Rather, all that is required is creation of structures along the lines of those found in a snapshot, namely organizational data along the lines of that found in a snapshot's root inode, along with preservation of the data pointed to by that organizational data.

Furthermore, the invention is not limited to the particular arrangements discussed above. Rather, those arrangements illustrate some possible types of relationships between active file systems, snapshots, and new active file-systems. Other arrangements are possible and are within the scope of the invention.

System Elements

Figure 11:
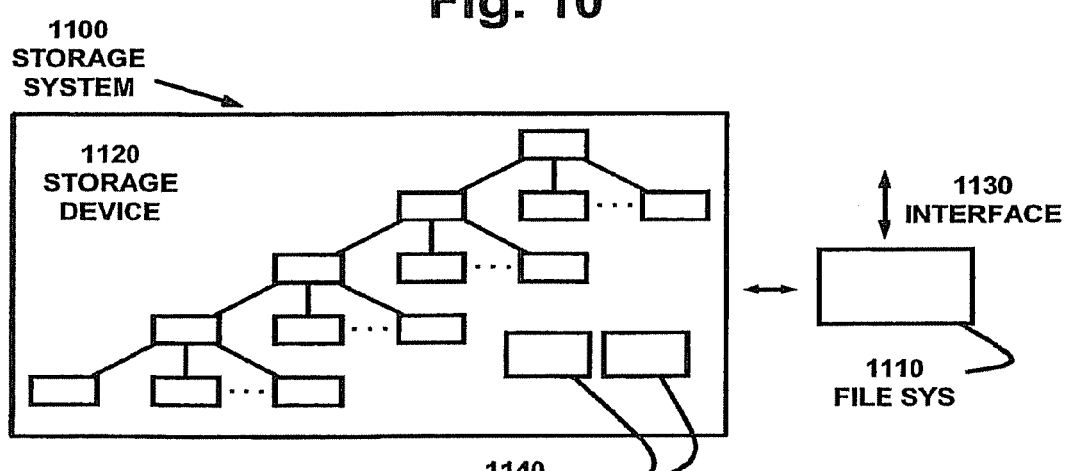
FIG. 11 shows a block diagram of a storage system including plural active file systems according to the invention.

FIG. 11 shows a block diagram of a storage system including plural active file systems according to the invention.

A system 1100 includes at least one file system processor 1110 (i.e., controller) and at least one storage device 1120 such as a hard disk or CD-ROM drive. The system also preferably includes interface 1130 to at least one computing device or network for receiving and sending information. In an alternative embodiment, processor 1100 is the processor for a computing device connected to the storage system via interface 1130.

Processor 1110 performs the tasks associated with the file system, as described herein, under control of program and data memory, the program and data memory including appropriate software for controlling processor 1110 to perform operations on storage device 1120 (and possibly for controlling storage device 1120 to cooperate with processor 1110).

In a preferred embodiment, at least one such storage device 1120 includes one or more boot records 1140. Each boot record 1140 includes two or more (preferably two) entries designating a root data block (i.e., inode) in a file system hierarchy for an active file system. Where there is a single active file system, there preferably is a single such boot record; where there is more than one such active file system, there preferably is more than one such boot record.

As noted above, more than one active file system might be present in storage device 1120. In such cases, the file system maintainer (i.e., processor 1110 operating under program control) preferably will designate and orderly maintain more than one boot record 1140, one for each such active file system.

Read-only snapshots also can be present in storage device 1120. In this case, pointers from active file systems to snapshots and from snapshots to other snapshots are stored in the storage device, as discussed above.

High Availability

Figure 12:
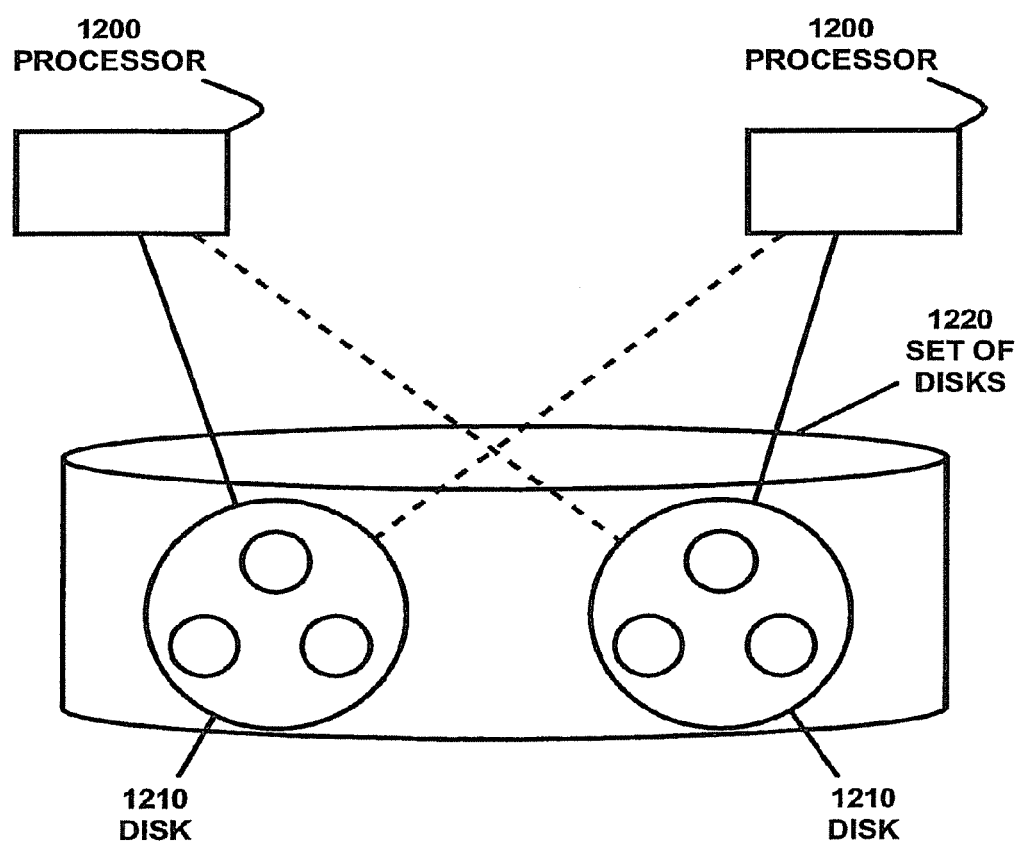
FIG. 12 shows a block diagram of a file system cluster including multiple concurrent active file systems being used by multiple concurrent file servers according to the invention.

FIG. 12 shows a block diagram of a file system cluster including multiple concurrent active file systems being used by multiple concurrent file servers according to the invention.

A file system cluster includes a plurality of file system processors 1200 and one or more file system disks 1210. In a preferred embodiment, each such processor 1200 is disposed for operating as a file server, capable of receiving file server requests and making file server responses, such as using a known file server protocol. In a preferred embodiment, the one or more file system disks 1210 include a plurality of such disks, so that no individual disk 1210 presents a single point of failure for the entire highly-available cluster. The Write Anywhere File System Layout (WAFL), which preferably is used with the invention, incorporates such an arrangement.

As discussed above, the plurality of processors 1200 can maintain multiple parallel writeable active file systems 1210, along with all associated snapshots for those parallel writeable active file systems. The active file systems and snapshots can be maintained on the same set of disks 1220. Thus, the set of processors 1200 and the set of disks 1220 can provide a highly available cluster without need for substantial duplication of resources.

Alternative Embodiments

The invention can be embodied in methods for creating and maintaining plural active file systems, as well as in software and/or hardware such as a storage device or devices that implement the methods, and in various other embodiments.

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Furthermore, although preferred embodiments of the invention are disclosed herein, many variations are possible which remain within the content, scope and spirit of the invention, and these variations would become clear to those skilled in the art after perusal of this application.

What is claimed is:

1. A method for operating a computer data storage system, comprising:

maintaining an original active file system having a first hierarchy of files;

storing new data of modified files of the original active file system at a selected time to first blocks newly allocated in a data storage device of the computer data storage system;

storing pointers to the new data of modified files of the original active file system at the selected time to second blocks newly allocated in the data storage device, the new data and a previously stored old data forming a consistency point of the original active file system at the selected time, the consistency point being a valid image of the active file system stored to the data storage device at the selected time; and severing a previous pointer from the original active file system to the consistency point to form a new active file system having a second hierarchy of files.

2. The method as in claim 1, further comprising:

saving data received after the selected time to the original active file system, the data not available to the new active file system.

3. The method as in claim 1, further comprising:

saving data received after the selected time to the new active file system, the data not available to the original active file system.

4. The method as in claim 1, further comprising:

saving a first change to the original active file system after the selected time without affecting the new active file system; and saving a second change to the new active file system after the selected time without affecting the original active file system.

5. The method as in claim 1, further comprising:

using a write anywhere file system to maintain the original active file system and the new active file system.

6. The method as in claim 1, further comprising:

using a first processor to maintain the original active file system and a second processor to maintain the new active file system.

7. The method as in claim 1, further comprising:

the consistency point having the pointers to the new data and the old data stored to the data storage device.

8. The method as in claim 1, further comprising:

using a disk drive as the storage device.

9. The method as in claim 1, further comprising:

using a CD-ROM drive as the storage device.

10. The method as in claim 1, further comprising:

using a memory as the storage device.

11. The method as in claim 1, further comprising:

using a DRAM as the storage device.

12. The method as in claim 1, further comprising:

using a SRAM as the storage device.

13. A method for operating a computer data storage system, comprising:

maintaining an original active file system having a first hierarchy of files;

storing new data of modified files of the original active file system at a selected time to first blocks newly allocated in a data storage device of the computer data storage system;

storing pointers to the new data of modified files of the original active file system at the selected time to second blocks newly allocated in the data storage device, the new data and a previously stored old data forming a consistency point of the original active file system at the selected time, the consistency point being a valid image of the active file system stored to the data storage device at the selected time;

severing a previous pointer from the original active file system to the consistency point to form a new active file system having a second hierarchy of files;

the consistency point having the pointers to the new data and the old data stored to the data storage device, saving a first change to the original active file system after the selected time without affecting the new active file system; and saving a second change to the new active file system after the selected time without affecting the original active file system.

14. A computer data storage system apparatus, comprising:
an original active file system having a first hierarchy of files;
a data storage device having new data of modified files of the original active file system written at a selected time to first blocks newly allocated in the data storage device;
second blocks in the data storage device newly allocated at the second time to store pointers to the new data of modified files of the original active file system, the new data and a previously stored old data forming a consistency point of the original active file system at the selected time, the consistency point being a valid image of the active file system stored to the data storage device at the selected time; and
a new active file system having a second hierarchy of files formed by severing a previous pointer from the original active file system to the consistency point.

15. The apparatus as in claim 14, further comprising:
data received after the selected time written to the original active file system, the data not available to the new active file system.

16. The apparatus as in claim 14, further comprising:
data received after the selected time written to the new active file system, the data not available to the original active file system.

17. The apparatus as in claim 14, further comprising:
a first change to the original active file system saved after the selected time without affecting the new active file system; and
a second change to the new active file system saved after the selected time without affecting the original active file system.

18. The apparatus as in claim 14, further comprising:
a write anywhere file system used to maintain the original active file system and the new active file system.

19. The apparatus as in claim 14, further comprising:
a first processor used to maintain the original active file system and a second processor used to maintain the new active file system.

20. The apparatus as in claim 14, further comprising:
the consistency point having the pointers to the new data and the old data written to the data storage device.

21. The apparatus as in claim 14, further comprising:
the storage device is a disk drive.

22. The apparatus as in claim 14, further comprising:
the storage device is a CD-ROM.

23. The apparatus as in claim 14, further comprising:
the storage device is a memory.

24. The apparatus as in claim 14, further comprising:
the storage device is a DRAM.

25. The apparatus as in claim 14, further comprising:
the storage device is a SRAM.

26. A computer data storage system apparatus, comprising:
an original active file system having a first hierarchy of files;
a data storage device having new data of modified files of the original active file system written at a selected time to first blocks newly allocated;
second blocks in the data storage device newly allocated at the second time to store pointers to the new data of modified files of the original active file system, the new data and a previously stored old data forming a consistency point of the original active file system at the selected time, the consistency point being a valid image of the active file system stored to the data storage device at the selected time;
a new active file system having a second hierarchy of files formed by severing a previous pointer from the original active file system to the consistency point;
the consistency point having the pointers to the new data and the old data written to the data storage device;
a first change to the original active file system saved after the selected time without affecting the new active file system; and
a second change to the new active file system saved after the selected time without affecting the original active file system.

27. A computer readable storage media, comprising:
said computer readable storage media containing program instructions for execution on a processor for a method of operating a computer data storage system, the program instructions for,
maintaining an original active file system having a first hierarchy of files;
storing new data of modified files of the original active file system at a selected time to first blocks newly allocated in a data storage device of the computer data storage system;
storing pointers to the new data of modified files of the original active file system at the selected time to newly allocated second blocks in the data storage device, the new data and a previously stored old data forming a consistency point of the original active file system at the selected time, the consistency point being a valid image of the active file system stored to the data storage device at the selected time; and
severing a previous pointer from the original active file system to the consistency point to form a new active file system having a second hierarchy of files.

28. A method for operating a data storage system, comprising:
executing an operating system on a computer of the data storage system, the operating system to maintain the data storage system;
maintaining an original active file system having a first hierarchy of files, the active file system maintained by the operating system;
storing new data of modified files of the original active file system at a first selected time to first blocks newly allocated in a data storage device of the data storage system;
storing pointers to the new data to second blocks newly allocated in the data storage device, the new data and a previously stored old data forming a consistency point of the original active file system at the first selected time, the consistency point being a valid image of the active file system stored to the data storage device at the first selected time;
severing a previous pointer from the original active file system to the is consistency point to form a new active file system having a second hierarchy of files;
removing unwanted data from the new active file system by deleting pointers to the unwanted data from the new active file system;
deleting, at a second selected time after the first selected time, the consistency point of the original active file system after severing the pointer to form the new active file system; and
deleting selected data blocks which were included in the consistency point of the original active file system but which have been removed from new active file system.

29. A data storage system, comprising: an operating system to execute on a computer of the data storage system, the operating system to maintain the data storage system;
   an original active file system having a first hierarchy of files, the active file system maintained by the operating system;
   first blocks newly allocated in a data storage device of the data storage system to store new data of modified files of the original active file system at a first selected time;
   pointers to the new data stored to second blocks newly allocated in the data storage device, the new data and a previously stored old data forming a consistency point of the original active file system at the first selected time, the consistency point being a valid image of the active file system stored to the data storage device at the first selected time;
   a severing process executing under the operating system to sever a previous pointer from the original active file system to the consistency point to form a new active file system having a second hierarchy of files;
   unwanted data removed from the new active file system by deleting pointers to the unwanted data from the new active file system;
   a first deletion process executing under the operating system to delete, at a second selected time after the first selected time, the consistency point of the original active file system after severing the pointer to form the new active file system; and
   a second deletion process executing under the operating system to delete selected data blocks which were included in the consistency point of the original active file system but which have been removed from new active file system.

30. A computer readable storage media, comprising:
   said computer readable storage media containing program instructions for execution on a processor for a method of operating a data storage system, the program instructions for,
   executing an operating system on a computer of the data storage system, the operating system to maintain the data storage system;
   maintaining an original active file system having a first hierarchy of files, the active file system maintained by the operating system;
   storing new data of modified files of the original active file system at a first selected time to first blocks newly allocated in a data storage device of the data storage system;
   storing pointers to the new data to second blocks newly allocated in the data storage device, the new data and a previously stored old data forming a consistency point of the original active file system at the first selected time, the consistency point being a valid image of the active file system stored to the data storage device at the first selected time;
   severing a previous pointer from the original active file system to the consistency point to form a new active file system having a second hierarchy of files;
   removing unwanted data from the new active file system by deleting pointers to the unwanted data from the new active file system;
   deleting, at a second selected time after the first selected time, the consistency point of the original active file system after severing the pointer to form the new active file system; and
   deleting selected data blocks which were included in the consistency point of the original active file system but which have been removed from new active file system.

* * * * *